United States Patent
Johnson

[15] 3,706,470
[45] Dec. 19, 1972

[54] CAB TILT HYDRAULIC CIRCUIT
[72] Inventor: Robert E. Johnson, Kent, Wash.
[73] Assignee: Pacific Car and Foundry Company, Bellevue, Wash.
[22] Filed: July 23, 1970
[21] Appl. No.: 57,503

[52] U.S. Cl. .................................296/28 C, 180/89
[51] Int. Cl. ............................................B62d 33/06
[58] Field of Search..........296/28 C; 180/89; 298/38

[56] References Cited

UNITED STATES PATENTS

| | | | |
|---|---|---|---|
| 3,472,547 | 10/1969 | London | 180/89 |
| 2,749,175 | 6/1956 | King et al. | 298/38 |
| 2,740,487 | 4/1956 | Murty et al. | 180/89 |

Primary Examiner—Leo Friaglia
Assistant Examiner—John A. Pekar
Attorney—Seed, Berry & Dowrey

[57] ABSTRACT

A control system for use with a truck having a tilt type cab wherein the cab is tilted by means of hydraulic pressure. The system includes a hydraulically operated latch mechanism such that the operator may unlatch the cab and raise it using the same control mechanism. The system also includes a secondary control means which will override the first control means with respect to the latch structure enabling the operator to latch the cab in position such that it may not be raised by the first control means.

6 Claims, 2 Drawing Figures

PATENTED DEC 19 1972

3,706,470

INVENTOR.
ROBERT E. JOHNSON

BY
*[signature]*

ATTORNEYS

CAB TILT HYDRAULIC CIRCUIT

BACKGROUND OF THE INVENTION

In the cab-over-engine or tilting-cab type truck, the cab is pivotally secured to the vehicle frame at the front end of the cab so that when the cab is tilted forwardly the engine and accessories are exposed for convenient servicing and repairs. The invention is concerned with a locking means in combination with the lifting means, the first for locking the cab to the vehicle frame when the cab is in a closed position over the engine and the lifting means for moving the cab from the closed to the open position and supporting it during work upon the engine. The lifting means and the locking means are interrelated so that the operator may conveniently release the cab structure and lift said structure simultaneously using the same control mechanism.

It is an object of the present invention to provide a tilt cab structure having a hydraulic system wherein the same fluid source is used for both raising and lowering the cab as well as for unlatching the cab structure, enabling it to be raised, said unlatching function being subject to lockable overriding controls.

Another object of the present invention is to provide a latching and lifting structure for cab-over type trucks wherein the same control mechanism is used for unlatching the structure and lifting the cab.

Yet another object of the present invention is to provide a control system for a cab-over truck wherein the same circuit and pressure source is used for raising the cab and unlatching the cab, but further including a secondary control means which overrides the lifting control means. The secondary control means is operably connected to the latch structure enabling the operator to lock the cab in a closed position preventing raising of the cab.

DETAILED DESCRIPTION OF THE DRAWINGS

Figure 1:
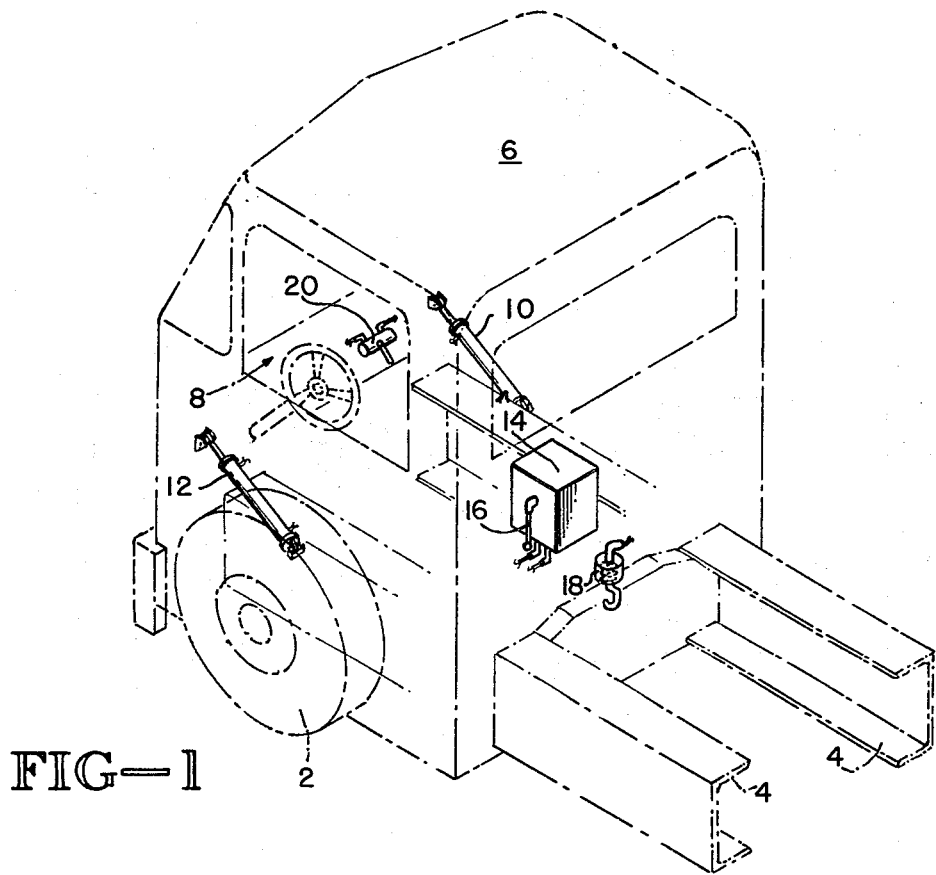
FIG. 1 is a schematic environmental view showing the relationship of the mechanism in the preferred embodiment.

As seen in FIG. 1, the inventive hydraulic circuit is designed to be used upon a cab-over vehicle having wheels 2, frame structure 4, and a cab 6 having a driver's compartment 8. The driver's compartment includes the conventional seat, steering wheel and operating instruments.

Figure 2:
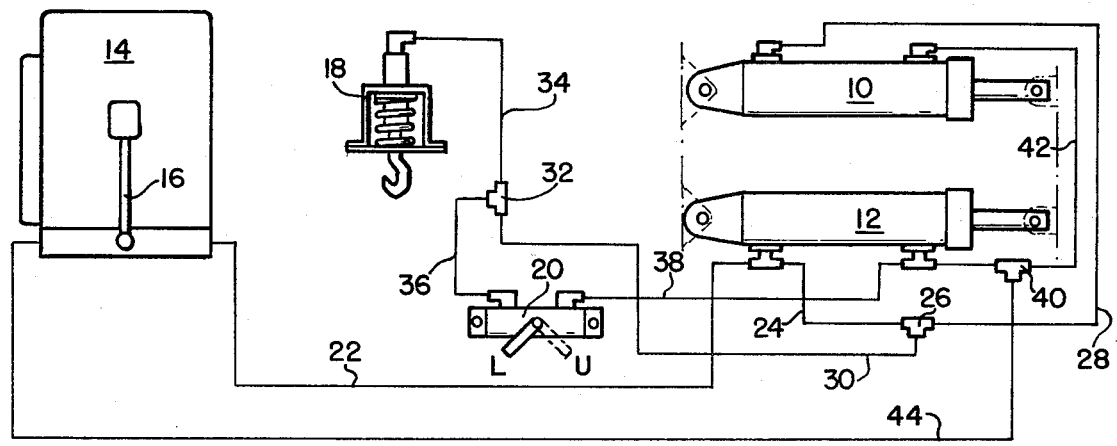
FIG. 2 is a hydraulic circuit diagram of a control mechanism for the inventive structure.

Secured to the forward portion of the cab, inside the shell, are a pair of telescoping cylinders 10 and 12 which are likewise secured to the framework, said cylinders providing a lifting force for tilting the cab during work upon the components such as the engine and cooling system, which are located beneath the cab construction. Mounted on the frame structure and accessible from the outside, the cab is a pump control means 14 for supplying hydraulic fluid to the cylinders 10 and 12 for raising the cab structure 6. Located upon the side of the pump housing is a handle 16 for actuating the pump and directing the pressure necessary for expanding the cylinders and raising the cab 6. Mounted to the rear portion of the cab and adapted to cooperate with a structure mounted to the frame is a hydraulically operated latch mechanism 18 which may be similar to that disclosed in U.S. Pat. No. 3,497,257, issued Feb. 24, 1970 to Mr. Hirst. There is sufficient piping to connect the hydraulic pump to the telescoping cylinders 10 and 12 and to manually operated hydraulic control valve 20 and to the latch mechanism 18. The valve 20 is located in the cab 6 as illustrated in FIG. 1. described with reference to FIG. 2 which includes a schematic representation of the various elements hereinabove described. As seen in FIG. 2, the control valve 20 has two positions: locked, which is the open position of the valve, and unlocked, which would be the closed position of the valve in the preferred embodiment. The circuit will now be described with the valve in its locked or open position. The operator will start the pump 14 by moving the handle 16 to the appropriate position, fluid will be circulated through lines 22, 24 and 28 to the cylinders 10 and 12 where pressure will be placed upon the pistons withing the cylinders 10 and 12 where pressure will be placed upon the pistons within the cylinders attempting to open the cab. In this condition, i.e., locked, the latch mechanism 18 will be secured to the framework preventing the cab from tilting. As noted above, the latch still is locked, preventing the cab from tilting, and the fluid under pressure will leave junction point 26 via line 30 proceeding to junction point 32. An increase in fluid pressure in line 34 would unlatch the cab. However, since the valve 20 is in its locked or open condition, the fluid will circulate without impedance through line 36 passing immediately through valve 20 through line 38 and 42 to the other ends of double acting cylinders 10 and 12. The fluid passes through junction point 40 and then through line 44 back to the reservoir (not shown). The fluid will continue to circulate as noted above without impedance. In summary, it can be seen that when the valve 20 is in its locked or open position, the fluid will be pumped through lines 22, 24, 30, 36, 38 and 44 back to the pump without activating any of the elements.

When the operator wishes to lift a cab for maintenance purpose, he will move the valve 20 to the unlocked position, which is the closed position of the valve. The operator then activates the pump and fluid under pressure entering line 22 passes through line 24 and line 30 but will not be allowed to pass through valve 20. The resultant pressure in line 34 will unlatch the latch 18. Latch 18 requiring less operating pressure than cylinders 10 and 12 disengages almost immediately. When the latch 18 is disengaged, the pistons within the double acting cylinders 10 and 12 can move when sufficient pressure is achieved and will thus raise the cab.

When the operator wishes to lower the cab, he will move the handle 16 to the appropriate position allowing all of the fluid to leave the lines and go into the reservoir allowing the cab to slowly return to its lowered position at which point the spring activated latch will secure the cab position.

It can thus be seen that with the additional valve control 20 located within the cab of the vehicle, that once the vehicle doors are locked, it is impossible to raise the cab structure for purposes of vandalism or the like. With the valve in the locked or open position, the pump will simply circulate the fluid through the system without damage. In the event that the latch were forced, an attempt to raise the cab hydraulically would be frustrated since the open valve 20 would not allow sufficient pressure build up to operate the cab raising cylinders.

The embodiments of the invention in which an exclusive property or privilege is claimed are defined as follows:

1. A remote control latch mechanism for a tilt-type cab comprising; a hydraulically operated latch, hydraulic lift means for tilting the cab, fluid control means for simultaneously disengaging said latch and lifting said cab, and remote override means functionally interconnected with a conduit interconnecting the latch means, the lift means and the control means, said ove-ride means allowing fluid pumped to the lift means and the latch means to circulate freely, not causing latch disengagement or lift actuation whereby the remote override means may be utilized, preventing unauthorized tilting of the cab.

2. A latch mechanism as in claim 1 wherein the remote override means is located within the cab of the truck.

3. A hydraulic control circuit for use with a truck including a main frame and an enclosed operator's cab utilizing a hydraulic lift for a tilt cab comprising: a source of fluid under pressure, latch means for selectively latching the cab to the frame, hydraulic ram means mounted between the cab and the framework to lift one edge of the cab from the framework permitting access to mechanism thereunder, conduit means interconnecting the source of fluid under pressure with the ram and the latch, control means interconnected with the conduit means for directing fluid under pressure simultaneously to the latch means and the ram means said latch requiring less pressure to operate assuring an unlatch of the cab prior to actuation of the ram to raise the cab, override means mounted within the cab and interconnected with the conduit means operable to selectively permit or to prevent pressure buildup within the circuit whereby when the cab is locked and the override means is placed in the locked or open condition it is impossible to raise the cab.

4. A circuit as in claim 3 wherein the override means comprises a hydraulic valve which, when in the open or locked condition, allows free flow of the fluid from the pressure source through the conduits and back to the source without significant pressure buildup within the system.

5. A circuit as in claim 3 wherein the control means is mounted exteriorly of the cab and allows control of the hydraulic ram means from outside the cab when the override means is in its closed or unlocked condition.

6. A circuit as in claim 3 wherein the latch means, the hydraulic ram means, and the override means are all operatively interconnected with a closed circuit connected with the source of fluid under pressure such that opening of the override means disables the latch means and the ram means by allowing free flow of fluid and preventing tilt of the cab.

* * * * *